United States Patent [19]

Brown

[11] 4,058,338
[45] Nov. 15, 1977

[54] HANDLE ASSEMBLY

[75] Inventor: Richard N. Brown, Macungie, Pa.

[73] Assignee: General Electric Company, Bridgeport, Conn.

[21] Appl. No.: 736,505

[22] Filed: Oct. 28, 1976

[51] Int. Cl.² .......................................... A47J 45/07
[52] U.S. Cl. ................................................ 294/31.2
[58] Field of Search ............... 294/27 R, 27 H, 31.2; 16/110 A, 114 R, DIG. 25; 81/3.43; 215/100 A; 224/45 A, 45 P, 51, 55, 58; 248/315

[56] References Cited

U.S. PATENT DOCUMENTS

| 1,977,364 | 10/1934 | Wolcott | 294/31.2 X |
| 1,977,367 | 10/1934 | Wolcott | 294/27 R X |
| 2,554,761 | 5/1951 | Walder | 294/31.2 |
| 2,854,279 | 9/1958 | Serio | 294/31.2 X |
| 2,982,577 | 5/1961 | Serio | 294/31.2 |
| 2,991,111 | 7/1961 | Freiman | 294/31.2 |
| 3,058,768 | 10/1962 | Freiman | 294/31.2 |
| 3,105,714 | 10/1963 | Kimber | 294/31.2 |
| 3,114,484 | 12/1963 | Serio | 222/465 |
| 3,252,728 | 5/1966 | Holton | 294/31.2 |
| 3,311,399 | 3/1967 | Holton | 294/31.2 |

OTHER PUBLICATIONS

Handle assembly, North American Philips Corp., Model HD5135.
Handle assembly, West Bend Catalog No. 5950.

Primary Examiner—Johnny D. Cherry
Attorney, Agent, or Firm—Leonard J. Platt; George R. Powers; John F. Cullen

[57] ABSTRACT

A handle assembly for a glass carafe wherein a metal band is positioned around the neck of the carafe and a plastic handle is connected to the metal band. A unique plastic block is provided with two generally parallel slots for receiving the ends of the metal band for temporarily holding the band on the carafe while the handle is being secured to the block and the band.

5 Claims, 6 Drawing Figures

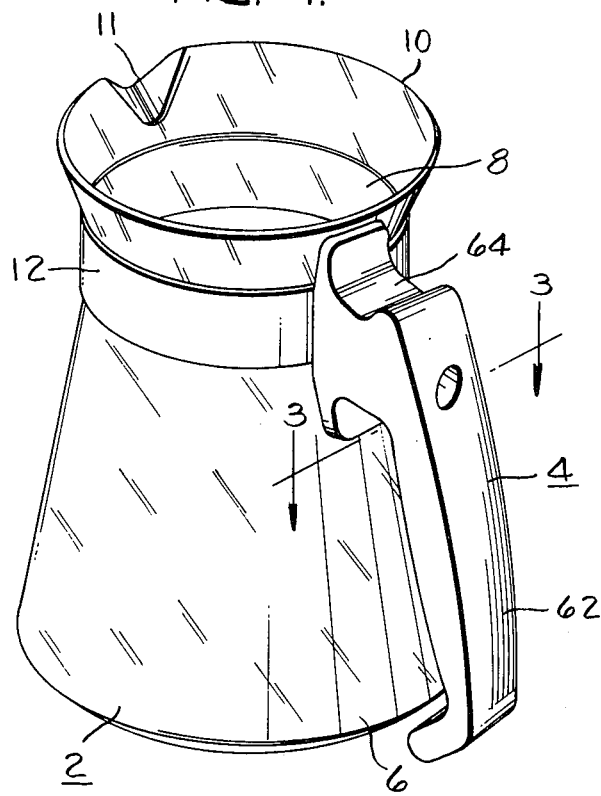
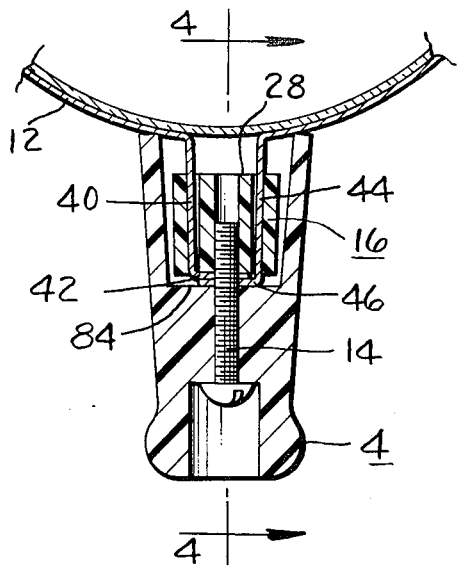
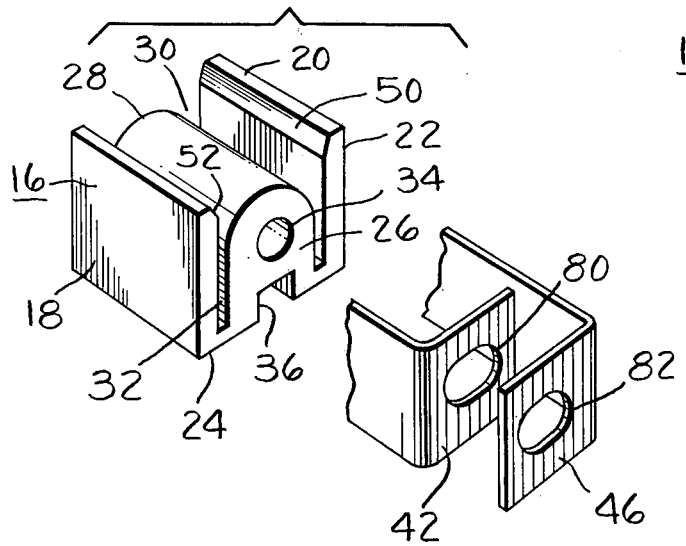
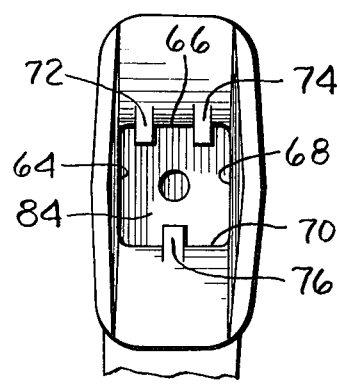

HANDLE ASSEMBLY

BACKGROUND OF THE INVENTION

1. Field of the Invention

This invention relates to a handle assembly for a glass carafe and, more particularly, to an arrangement for temporarily holding a metal band on the glass carafe while a handle is being secured to the carafe and to an improved rugged and substantial handle assembly.

2. Description of the Prior Art

In the manufacture of glass carafes and the like, it is conventional to provide a separate plastic handle and a spring metal band is usually positioned around the neck of the carafe to hold the handle on the carafe. Spring metal bands and handles of this type have included a number of different types of clips and fastening means for connecting the handle to the carafe. In a common fastening arrangement, the handle includes a socket for receiving a plastic block that is positioned between the ends of the spring metal band. Usually a screw extends through the handle, through the ends of the band, and is threaded into the plastic block. With this construction, as the screw is threaded into the block, the ends of the band are moved closer to each other, the band is tightened around the neck of the glass carafe and the handle is securely held on the glass carafe. In such assemblies the spring metal band must be placed around the neck of the carafe, the ends of the band must be held and the block must be positioned and held while the socket in the handle is placed over the block. The handle must then be held against the glass carafe while the screw is driven through the band ends and into the block. If the block slips from the band, the whole assembly can literally fly apart due to the spring forces induced in the band.

Accordingly it is a particular object of my invention to provide a fastening means that may temporarily hold a metal band on a glass carafe while a handle is being secured to the carafe so that the parts will be held together and will not spring apart while the handle is being secured to the carafe.

It is a further object of my invention to provide a handle assembly which is substantial and rugged so that the ends of the band cannot be easily deformed or twisted out of shape while the handle is being used to lift the glass carafe after it has been filled with coffee or other liquid.

It is a further object of my invention to provide a handle assembly having relatively few parts which may be readily manufactured at relatively low cost and easily connected to each other.

SUMMARY OF THE INVENTION

In accordance with one of the aspects of this invention a flexible band is constructed to include two end portions, and each end portion is shaped to include a leg portion and a foot portion arranged generally perpendicular to the leg portion. The assembly includes a substantial plastic block having two generally parallel slots formed in a side wall for receiving the leg portions of the band. One leg portion is positioned in one of the slots with its foot portion being in engagement with an end wall of the block while the other leg portion is positioned in the other slot with its foot portion being positioned on top of and in engagement with the foot portion of the other end of the band. A plastic handle is provided with a complementary socket for receiving the block and the end portions of the band. A screw is connected through the handle, the block and the end portions of the band for securely holding them in assembled position. With this construction, my unique block temporarily holds the band on the carafe while the handle is being secured to the block and the band. The normal spring forces of the band urge the block against the foot portion of one leg that in turn presses against the foot portion of the other leg to hold the legs in the slots of the block without having the assembly literally fly apart due to the spring forces induced in the band.

Moreover, with this construction after the screw has been tightened to cause the band to securely grip the vessel the leg portions and foot portions of the band will be securely sandwiched in position between the walls of the block and the socket walls of the handle. Thus, the handle is securely held in position on the glass carafe and should the screw be loosened slightly due to normal expansion and contraction forces when the vessel is filled with hot and cold liquids, for example, the ends of the band will be held in position within the slots of the block without becoming distorted or twisted upon slight torsional movements of the handle with respect to the glass carafe.

In addition, with this unique construction, relatively few parts are required for holding the plastic handle to the glass carafe. The plastic block may be formed of low-cost plastic and the slots for receiving the ends of the band may be provided during the molding of the block. Accordingly, an improved relatively rugged handle assembly which may be readily manufactured has been achieved.

BRIEF DESCRIPTION OF THE DRAWING

Other objects and attendant advantages of the invention will be apparent from the following description taken in connection with the accompanying drawing in which:

FIG. 1 is a front top perspective view of a glass coffee carafe which includes a handle assembly constructed in accordance with my invention;

FIG. 2 is a fragmentary exploded perspective view of a plastic block and end portions of a metal band for holding a handle on the glass carafe shown in FIG. 1;

FIG. 3 is a fragmentary cross-sectional view of the improved handle assembly taken substantially on the plane of 3—3 of FIG. 1;

FIG. 4 is a fragmentary cross-sectional view taken substantially on the plane of 4—4 of FIG. 3;

FIG. 5 is a fragmentary rear view of the handle shown in FIG. 1 illustrating a socket provided in the handle.

DESCRIPTION OF THE PREFERRED EMBODIMENT

Figure 6:
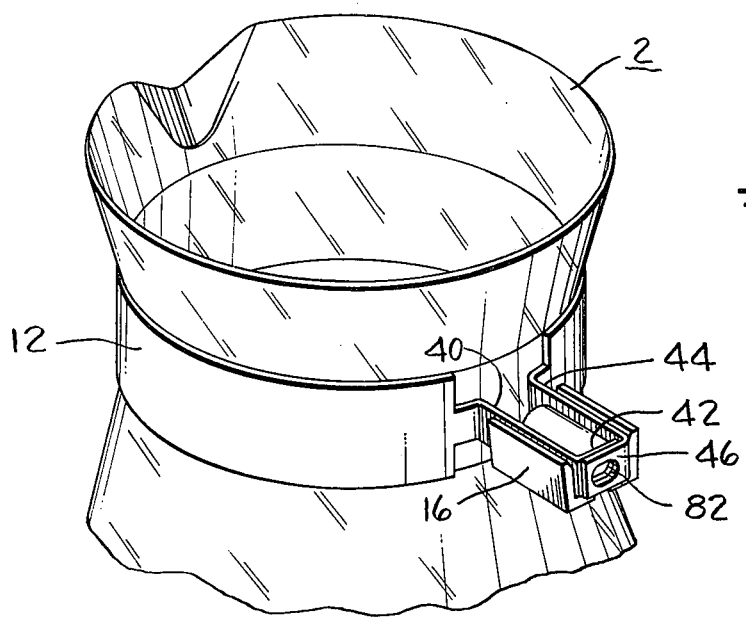
FIG. 6 is a perspective view showing the block holding the band in place before the handle is assembled.

Referring now to the drawing and first particularly to FIG. 1, there is shown a glass coffee carafe which includes my unique handle assembly for effectively securing a handle 4 on the glass carafe 2. While the utensil 2 could be formed in various shapes and sizes it can be appreciated that in the illustrated preferred embodiment of my invention the utensil 2 is a glass vessel having a body portion 6, a generally cyclindrical neck portion 8, and a flared upper portion 10 with a pouring spout 11. Vessels of this type commonly have been used as brewed coffee carafes.

As shown more particularly in FIG. 1 and 3, the handle 4 is held onto the neck portion 8 of the carafe by means of a spring metal band 12 that encircles the neck portion of the carafe and is attached to the band by means of a screw 14.

In accordance with my invention, a unique plastic block 16 is provided for temporarily holding the band 12 in position on the glass carafe while the handle 4 is positioned over the ends of the band 12 and the screw 14 is connected to the ends of the bands and the plastic block so that the whole assembly does not literally fly apart as the handle is being connected to the ends of the band. As shown more particularly in FIG. 2, the block is generally rectangular in cross-section and can be considered to have four generally flat side walls 18, 20, 22, 24, and two generally flat end walls 26 and 28. The side wall 20 is substantially broken by two slots 30 and 32 that are provided for uniquely holding the ends of the band 12. The block also includes a generally central cylindrical screw receiving bore 34 and a groove 36 for a purpose to be more fully explained hereinafter.

With particular reference to FIG. 3 it can be seen that the ends of the band are shaped for reception by the plastic block 16. One end of the band is shaped to include a generally straight leg portion 40 and a foot portion 42, while the other end of the band is shaped to include a generally straight leg portion 44 and a foot portion 46. As illustrated, the leg portions 40 and 44 are arranged generally parallel to each other, one of the foot portions 42 is shown in engagement with the end wall 26 of the block, and the other foot portion 46 is shown in engagement with the other foot portion 42.

With this unique arrangement, the band 12 may be positioned around the neck 8 of the vessel with the legs 40 and 44 held generally parallel to each other and the foot portions 42 and 46 interleaved with respect to each other so that the plastic block can be readily slipped into position by simply pushing it upwardly to receive the legs 40 and 44 within the slots 30 and 32.

The upper walls 50 and 52 of the slots 30 and 32 respectively, may be inclined slightly in order to facilitate movement of the legs 40 and 44 into the slots 32 and 30, respectively. The block 16 may then be released, and the normal spring forces of the band will urge block 16 against the foot portion 42 of leg 40 that in turn presses against the foot portion 46 of the leg 44 to hold the legs 40 and 44 in the slots 32 and 30 of the block without having the assembly literally fly apart due to the spring forces induced in the band 12. Thus, my unique plastic block 16 may temporarily hold the ends of the band 12 in assembled position for at least a short period of time while the handle 4 is lifted and positioned over the block 16 and the screw 14 is connected to the block.

In accordance with my invention, handle 4, and particularly its socket portion 60 is uniquely shaped for cooperation with the block 16 and the ends of the band for effectively sandwiching and holding the parts in their assembled positions against both rotational and lateral movements in order to provide a very effective rugged and substantial handle assembly. The handle 4 conventionally includes a depending generally longitudinal grip portion 62 and a laterally extending portion 64 for engagement with the vessel 6.

As shown more particularly in FIG. 5, the socket portion 60 of the handle is uniquely shaped for receiving the plastic block 16. As shown, it is generally rectangular in shape and includes four generally flat walls 64, 66, 68, and 70 for receiving the complementary walls 18, 20, 22, and 24 of the block to prevent any torsional movement between the block 16 and the handle.

In order to very effectively hold the legs 40 and 44 of the band within the slots 30 and 32, two downwardly extending ribs 72 and 74 are provided on the wall 66 of the handle socket 60 for extending into the slots 30 and 32 in order to confine the leg portions 40 and 44 of the band. A land 76 extends upwardly from the wall 70 for cooperating with the groove 36 formed in the bottom wall 24 of the block for suitably confining the bottom portion of the block 16 from any lateral or rotational movement with respect to the socket 60. Thus, a rather rugged and substantial assembly has been achieved.

It can be appreciated that with the ends of the band 12 temporarily held by the block 16, the handle may be easily secured to the block and the band by simply moving it over the block and toward the carafe. During such movement, the ribs 72 and 74 and the land 76 will naturally slide into the slots 30, 32 and the groove 36. Then the screw 14 may be passed through apertures 80 and 82 that are provided in the foot portions 42 and 46, respectively, of the ends of the band and screwed into bore 34. With particular reference to FIG. 3, it can be appreciated that as the screw 14 is threaded into the bore 34, the band 12 will be tightened around the neck 8 of the vessel and the foot portions of 42 and 46 will be compressed between a flat end wall 84 of the socket and the end wall 26 of the block.

With this rugged construction, it can be appreciated that even if the band 12 loosens slightly with respect to the neck of the vessel due to usual expansion and contraction forces that occur when hot and cold liquids are alternately poured into the carafe, the leg portions 40 and 44 of the band and the block will still be very effectively confined within the handle by the slots 30 and 32 of the block and the generally rectangular socket 60 and its ribs 72 and 74 and land 76.

In view of the foregoing, it can also be appreciated that my improved, rugged and substantial handle assembly may be readily formed and manufactured at relatively low cost. Slots 30 and 32, bore 34, and groove 36 may readily be formed in the plastic block 16 in one operation as the block is being molded. Likewise, the generally rectangular socket 60 of the handle, ribs 72 and 74 and land 76 may all be formed in one operation as the handle 4 is being molded. Clearly, assembly is facilitated since my unique plastic block 16 temporarily holds the band 12 on the carafe while the handle 4 is being connected to the block and the band. Thus, an exceedingly simply and reliable improved handle assembly for a glass coffee carafe has been achieved.

What I claim is:

1. A handle assembly for securing a handle on a utensil comprising:
   a. a flexible band positioned around said utensil, said band having a central portion and two end portions, each of said end portions being shaped to include an elongated leg portion and a foot portion arranged generally perpendicular to the leg portion;
   b. a block for holding said band in assembled position on said utensil, said block having end wall means and side wall means, two slots formed in said side wall means arranged generally parallel to each other for receiving the leg portions of said band, one leg portion being positioned in one of said slots with its foot portion being in engagement with the end wall means of the block and the other leg portion being positioned in the other slot with its foot portion being positioned in engagement with the foot portion of the other end of the band;

c. a handle having a socket for receiving said block and the end portions of said band; and d. fastening means connected to the handle, the block and the end portions of said band for securely holding them in assembled position.

2. A handle assembly as defined in claim 1 wherein the block is substantially rectangular in cross section, the socket formed in the handle is substantially rectangular in cross section, and the handle includes two ribs that extend inwardly into the socket, said ribs being generally parallel to each other and complementary to the two generally parallel slots that are formed in the block for providing a closure for the upper portion of the slots in order to suitably confine the end portions of the band within the slots in the block.

3. A handle assembly as defined in claim 1 wherein the block includes a third slot formed in said side wall means, said third slot being positioned opposite to the other slots, and said handle including a land extending inwardly into said socket for cooperating with the groove formed in the block in order to effectively hold the block against rotational movement within the socket of the handle.

4. A handle assembly as defined in claim 1 wherein the fastening means includes a screw and the block includes a centrally disposed screw receiving bore, said bore being arranged generally parallel to said slots, and wherein the socket of the handle includes a substantially flat end wall so that as the screw is tightened within the bore the block and the foot portions of the band will be moved toward the flat wall of the socket to press and sandwich the foot portions between the flat wall of the socket and the block.

5. A glass carafe comprising:

a. a glass vessel having a body portion and a neck portion;

b. a flexible band formed of spring metal positioned around the neck portion of said vessel, said band having a central portion and two end portions, each of said end portions being shaped to include an elongated leg portion and a foot portion arranged generally perpendicular to the leg portion;

c. a plastic block for holding said band in assembled position on said vessel, said block having end wall means and side wall means, two slots formed in said side wall means arranged generally parallel to each other for receiving the leg portions of said band, one of the foot portions of the band being in engagement with the end wall means of the block and the other foot portion being positioned against the foot portion of the other end of said band;

d. a plastic handle having a generally longitudinal handle grip portion and a laterally extending portion for engagement with the vessel, a laterally extending socket formed in the lateral portion of said handle, said socket having a recess substatially complementary to the plastic block, said block and the end portions of said band extending into said recess so that the walls of said socket substantially enclose the block and the end portions of said band; and e. screw means extending through the lateral portion of said handle and being connected to said block for tightening said band around the neck of said vessel and for securely holding the band and the block in assembled position on the vessel.

* * * * *